(12) United States Patent
Bollinger et al.

(10) Patent No.: US 6,833,777 B2
(45) Date of Patent: Dec. 21, 2004

(54) SWITCHING METHOD FOR AN ELECTROMAGNETIC SWITCHING DEVICE AND AN ELECTROMAGNETIC SWITCHING DEVICE CORRESPONDING THERETO

(75) Inventors: Georg Bollinger, Neunburg (DE); Peter Donhauser, Schwandorf (DE)

(73) Assignee: Siemens Aktiengesellschaft, Munich (DE)

( * ) Notice: Subject to any disclaimer, the term of this patent is extended or adjusted under 35 U.S.C. 154(b) by 206 days.

(21) Appl. No.: 10/240,821

(22) PCT Filed: Mar. 30, 2001

(86) PCT No.: PCT/DE01/01220
§ 371 (c)(1),
(2), (4) Date: Oct. 7, 2002

(87) PCT Pub. No.: WO01/78210
PCT Pub. Date: Oct. 18, 2001

(65) Prior Publication Data
US 2003/0052756 A1 Mar. 20, 2003

(30) Foreign Application Priority Data
Apr. 7, 2000 (DE) .......................................... 100 17 375

(51) Int. Cl.[7] ............................ H02H 7/22; H01H 81/04
(52) U.S. Cl. ............................ 335/6; 335/132; 335/185
(58) Field of Search ........................ 335/6–22, 132–138, 335/172–178, 185–202

(56) References Cited

U.S. PATENT DOCUMENTS

| 4,470,028 A | * | 9/1984 | Vayre et al. ................... 335/16 |
| 5,163,175 A |   | 11/1992 | Mori et al. |
| 5,233,321 A | * | 8/1993 | Blanchard et al. .......... 335/132 |
| 6,034,585 A | * | 3/2000 | Donhauser ................... 335/132 |

FOREIGN PATENT DOCUMENTS

| DE | 41 04 533 C2 | 2/1991 |
| DE | 198 38 057 C1 | 10/1995 |
| DE | 198 09 205 A1 | 3/1998 |
| FR | 481934 | 1/1917 |
| FR | 481 934 | 1/1917 |

* cited by examiner

Primary Examiner—James R. Scott
(74) Attorney, Agent, or Firm—Harness, Dickey & Pierce, P.L.C.

(57) ABSTRACT

The aim of the invention is to protect an electromagnet switching device when a load is switched to a supply voltage. A current that flows through the load contact is monitored. The electric circuit is interrupted when the current exceeds a threshold value that is below the current carrying capacity of the load contact. The electric circuit is automatically closed again after the current which flows through the load contact has decreased.

17 Claims, 1 Drawing Sheet

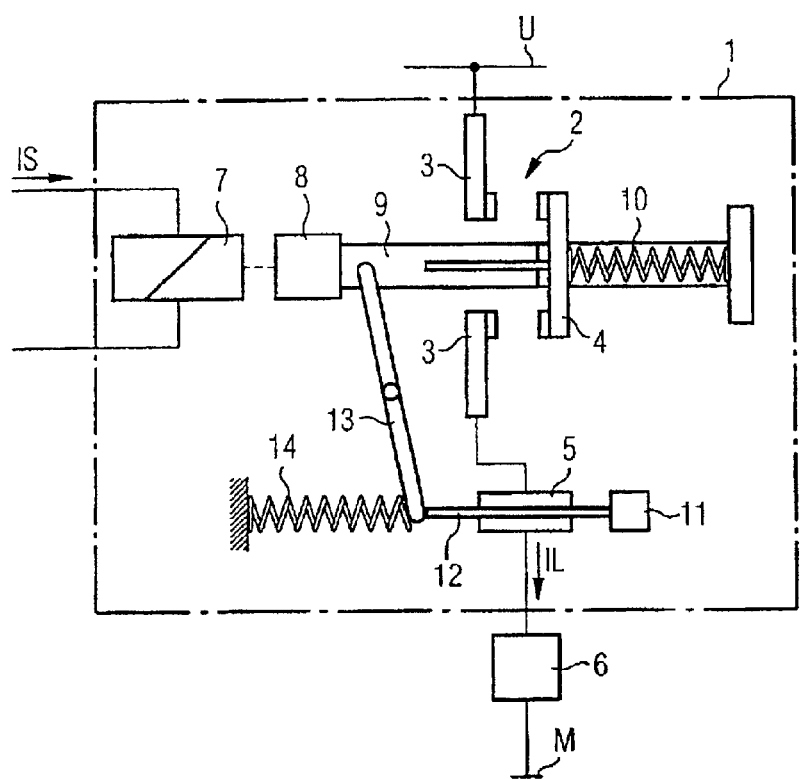

SWITCHING METHOD FOR AN ELECTROMAGNETIC SWITCHING DEVICE AND AN ELECTROMAGNETIC SWITCHING DEVICE CORRESPONDING THERETO

This application is the national phase under 35 U.S.C. § 371 of PCT International Application No. PCT/DE01/01220 which has an International filing date of Mar. 30, 2001, which designated the United States of America and which claims priority on German Patent Application number DE 100 17 375.6 filed Apr. 7, 2000, the entire contents of which are hereby incorporated herein by reference.

FIELD OF THE INVENTION

The present invention generally relates to a switching method for an electromagnetic switching device. In particular, it may relate to a switching method for a contactor, having at least one load contact which has a current carrying capacity, wherein the load contact is closed, wherein the closing of the load contact closes a circuit, wherein the circuit is opened when a current flowing through the load contact exceeds a current limit value, and to an electromagnetic switching device which corresponds to it.

BACKGROUND OF THE INVENTION

Switching methods and switching devices are known. They are used, for example, in a series circuit including a contactor with an upstream or downstream circuit breaker, or in the form of a so-called non-welding contactor. In both cases, the opening of the circuit provides short-circuit protection for the contactor.

In some applications, an extremely high surge current flows briefly when the circuit is closed. In the case of transformers, the surge current may amount to 20 to 30 times the continuous current, and in the case of capacitors it may even amount to 50 to 100 times the continuous current. The switching device must always be designed such that it can safely switch even this high surge current. The switching device therefore has to be considerably over-designed in order to switch transformers or capacitors, in comparison to the continuous current to be carried.

SUMMARY OF THE INVENTION

An object of an embodiment of the present invention is to specify a switching method for an electromagnetic switching device and for the electromagnetic switching device corresponding thereto. The switching device may be designed to be smaller, without changing the continuous current which can be carried.

An object may be achieved by the circuit being closed again automatically when the current flowing through the load contact falls below the current limit value again as a result of the opening of the circuit. Further, the current limit value may be, at most, as great as the current carrying capacity.

This is because, when the load is connected to the power supply system, the circuit is initially closed, and is then opened again before the current carrying capacity of the load contact is exceeded. The load contact is admittedly closed again immediately after this. The current surge which occurs when the load contact is closed for the second time is, however, considerably less than the current surge which occurred previously. As a rule, this second current surge no longer exceeds the current carrying capacity of the load contact. This thus means, for example when connecting a capacitor, that it is possible to use a switching device in which the current carrying capacity is, for example, 25 times the continuous current to be carried instead of—as in the prior art—75 to 100-times the continuous current to be carried.

When the load contact is opened in order to open the circuit when the current limit value has been exceeded, no dedicated switch is required to open the circuit.

When the current flows through an electromagnetic drive, which is connected in series with the load contact, with the circuit closed, which electromagnetic drive opens a switching element, which is connected in series with the electromagnetic drive, when the current limit value is exceeded, the circuit can be opened in a particularly simple manner when the current limit value is exceeded. If a pair of contact elements are electrically conductively connected by a contact link to which a pressure spring applies a pressure force in the direction of the pair of contact elements, in order to close the load contact, and the electromagnetic drive acts directly on the contact link when the current limit value is exceeded and lifts it off the pair of contact elements, the load current monitoring element responds particularly quickly.

If a deflection lever which is associated with the electromagnetic drive is deflected from a rest position by a plunger, which is associated with the electromagnetic drive, when the current limit value is exceeded, and the deflection of the deflection lever lifts the contact link off the pair of contact elements, this results in the electromagnetic switching device being particularly simple and compact.

BRIEF DESCRIPTION OF THE DRAWINGS

Further advantages and details can be found in the following description of an exemplary embodiment. In this case, illustrated in outline form, the single FIG. 1 shows an electromagnetic switching device.

DETAILED DESCRIPTION OF THE PREFERRED EMBODIMENTS

According to FIG. 1, a contactor as an example of an electromagnetic switching device has a housing 1. A load contact 2 is arranged in the housing 1. The load contact 2 has a pair of contact elements 3 and a contact link 4. The pair of contact elements 3 are connected firstly to a load voltage U and secondly via a load current monitoring element 5 to a load 6. The load 6 is in turn connected to ground M.

In order to close the load contact 2, a switching current IS is applied to a switching coil 7. In response, the switching coil 7 pulls in a main armature 8. The main armature 8 is connected to a contact support 9, which applies a pressure force via a pressure spring 10 to the contact link 4, with this pressure force being in the direction of the pair of contact elements 3.

The attraction of the main armature 8 thus results in the pair of contact elements 3 being electrically conductively connected via the contact link 4. The circuit is thus closed from the load voltage U via the load 6 to ground M. In consequence, a load current IL flows via the load contact 2, the load current monitoring element 5 and the load 6.

The load current IL results in a contact opening force, which is dependent on the load current. The load current IL counteracts the pressure force. The pressure force thus defines a maximum current which the load current 2 can carry. This maximum current is the so-called current carrying capacity of the load contact 2.

Depending on the load 6, a very high inrush current surge can flow briefly when the load contact 2 is first closed. The inrush current surge may possibly exceed the current carrying capacity of the load contact 2. The load current monitoring element 5 is therefore provided in order to protect the load contact 2. This is connected in series with the load contact 2, and is in the form of an electromagnetic drive. If the load current IL exceeds a current limit value, which is at most as great as the current carrying capacity of the load contact 2, the load current monitoring element 5 trips. In consequence, it pulls in an auxiliary armature 11. In consequence, the contact link 4 of the load contact 2 is lifted off the pair of contacts 3 via a plunger 12 and a deflection lever 13. The circuit is thus likewise opened by opening of the load contact 2, to be precise by the electromagnetic drive acting directly on the contact link 4.

The opening of the load contact 2 also interrupts the current flow through the load current monitoring element 5. It thus no longer exerts any pulling-in force on the auxiliary armature 11. The deflection lever 13, the plunger 12 and the auxiliary armature 11 are thus moved back to a rest position once again, via a resetting spring 14. At the same time, the load contact 2 is closed again by the pressure of the pressure spring 10.

The entire abovementioned switching process takes place without any action on the drive side of the contactor. The switching coil 7 thus still has the switching current IS applied to it despite the opening of the load contact 2, so that the main armature 8 and the contact support 9 remain in the "contactor on" switch position.

In principle, the contactor described above can be used for all loads 6. However, its use is particularly advantageous if the load 6 is a transformer or a capacitor, since particularly high current surges occur in these two cases.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A switching method for an electromagnetic switching device having at least one load contact with a current carrying capacity, wherein closing of the at least one load contact closes a circuit, comprising:

opening the circuit when a current flowing through at least one load contact exceeds a current limit value;

automatically closing the circuit when the current flowing through at least one load contact falls below the current limit value as a result of the opening of the circuit, wherein the current limit value is at most as great as the current carrying capacity.

2. The switching method as claimed in claim 1, wherein, when the current limit value is exceeded, the load contact is opened in order to open the circuit.

3. The switching method as claimed in claim 2, wherein, when the circuit is closed, the current flows through an electromagnetic drive, connected in series with the load contact and adapted to open a switching element, which is connected in series with the electromagnetic drive, when the current limit value is exceeded.

4. The switching method as claimed in claim 2, wherein, in order to close the load contact, a pair of contact elements are electrically conductively connected by a contact link, to which a pressure force is applied by a pressure spring in the direction of the pair of contact elements, and wherein the electromagnetic drive acts directly on the contact link when the current limit value is exceeded, and lifts it off the pair of contact elements.

5. The switching method as claimed in claim 4, wherein a deflection lever, which is associated with the electromagnetic drive, is deflected from a rest position by a plunger, associated with the electromagnetic drive, when the current limit value is exceeded, and wherein the deflection of the deflection lever lifts the contact link off the pair of contact elements.

6. The switching method as claimed in claim 1, wherein, when the circuit is closed, the current flows through an electromagnetic drive, connected in series with the load contact and adapted to open a switching element, which is connected in series with the electromagnetic drive, when the current limit value is exceeded.

7. The switching method as claimed in claim 6, wherein, in order to close the load contact, a pair of contact elements are electrically conductively connected by a contact link, to which a pressure force is applied by a pressure spring in the direction of the pair of contact elements, and wherein the electromagnetic drive acts directly on the contact link when the current limit value is exceeded, and lifts it off the pair of contact elements.

8. The switching method as claimed in claim 7, wherein a deflection lever, which is associated with the electromagnetic drive, is deflected from a rest position by a plunger, associated with the electromagnetic drive, when the current limit value is exceeded, and wherein the deflection of the deflection lever lifts the contact link off the pair of contact elements.

9. The switching method of claim 1, wherein the electromagnetic switching device is a contactor.

10. An electromagnetic switching device, comprising:

at least one load contact, which has a current carrying capacity; and a load current monitoring element, wherein a circuit which can be closed by the load contact is adapted to be opened by the load current monitoring element when a current flowing through the load contact exceeds a current limit value, wherein the circuit is adapted to be automatically closed again by the load current monitoring element when the current flowing through the load contact falls below the current limit value again as a result of the opening of the circuit, and wherein the load current monitoring element is designed such that the current limit value is at most as great as the current carrying capacity.

11. The switching device as claimed in claim 10, wherein the load current monitoring element is adapted to act on the load contact.

12. The switching device as claimed in claim 11, wherein the load current monitoring element is in the form of an electromagnetic drive, connected in series with the load contact and adapted to open a switching element, connected in series with the electromagnetic drive, when the current limit value is exceeded.

13. The switching device as claimed in claim 11, wherein the load contact includes a pair of contact elements and a contact link, the device further comprising:

a pressure spring adapted to apply a pressure force in the direction of the pair of contact elements to the contact link, wherein the electromagnetic drive is adapted to act directly on the contact link when the current limit value is exceeded, and lift it off the pair of contact elements.

14. The switching device as claimed in claim 13, wherein the electromagnetic drive further comprises:
a plunger and a deflection lever, wherein the plunger is adapted to deflect the deflection lever from a rest position when the current limit value is exceeded, and wherein the deflection of the deflection lever is adapted to lift the contract link off the pair of contact elements.

15. The switching device as claimed in claim 10, wherein the load current monitoring element is in the form of an electromagnetic drive, connected in series with the load contact and adapted to open a switching element, connected in series with the electromagnetic drive, when the current limit value is exceeded.

16. The switching device as claimed in claim 15, wherein the load contact includes a pair of contact elements and a contact link, the device further comprising:
a pressure spring adapted to apply a pressure force in the direction of the pair of contact elements to the contact link, wherein the electromagnetic drive is adapted to act directly on the contact link when the current limit value is exceeded, and lift it off the pair of contact elements.

17. The electromagnetic switching device of claim 10, wherein the electromagnetic switching device is a contractor.

* * * * *